(12) United States Patent
Beyabani

(10) Patent No.: US 8,176,506 B2
(45) Date of Patent: May 8, 2012

(54) PREDICTIVE CONTENT PRESENTATION

(75) Inventor: Syed Zafar Beyabani, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 554 days.

(21) Appl. No.: 12/136,165

(22) Filed: Jun. 10, 2008

(65) Prior Publication Data

US 2009/0307731 A1 Dec. 10, 2009

(51) Int. Cl.
*H04N 7/173* (2011.01)

(52) U.S. Cl. .................. 725/9; 725/46; 725/87

(58) Field of Classification Search .......... None
See application file for complete search history.

(56) References Cited

U.S. PATENT DOCUMENTS

| | | | |
|---|---|---|---|
| 2002/0144268 A1* | 10/2002 | Khoo et al. | 725/47 |
| 2006/0037045 A1* | 2/2006 | Hsieh | 725/43 |
| 2006/0200842 A1* | 9/2006 | Chapman et al. | 725/34 |
| 2007/0136751 A1* | 6/2007 | Garbow et al. | 725/46 |
| 2007/0157249 A1* | 7/2007 | Cordray et al. | 725/58 |
| 2007/0174862 A1* | 7/2007 | Kushida et al. | 725/15 |
| 2007/0250896 A1* | 10/2007 | Parker et al. | 725/135 |
| 2009/0028529 A1* | 1/2009 | Kuhns | 386/124 |
| 2009/0158380 A1* | 6/2009 | Derham et al. | 725/131 |
| 2010/0169910 A1* | 7/2010 | Collins et al. | 725/14 |
| 2010/0275230 A1* | 10/2010 | Yuen et al. | 725/43 |

* cited by examiner

*Primary Examiner* — James R Sheleheda
*Assistant Examiner* — Rong Le

(57) ABSTRACT

A system may automatically send a request for a list of programs over a network, obtain, in response to the request, a user profile that includes a list of programs that a viewer has accessed, send information identifying at least one of the programs over the network, and output the at least one of the programs to a preview window of a display.

15 Claims, 12 Drawing Sheets

PREDICTIVE CONTENT PRESENTATION

BACKGROUND

By interacting with a set-top-box (STB), a viewer may select channels or programs on a television that is connected to the STB, adjust display characteristics of the television, and/or perform other interactive functions related to viewing multimedia-type content. A remote control may be used to transmit signals that represent key depressions/input selections to the STB via infrared light.

DETAILED DESCRIPTION

The following detailed description refers to the accompanying drawings. The same reference numbers in different drawings may identify the same or similar elements. As used herein, the term "viewer" may refer to a person who views, listens, or plays a multimedia program, video, and/or music. In addition, as used herein, depending on context, terms such as "watching," "viewing," "accessing," "looking," "playing" (e.g., playing music), "presenting," "showing," or "outputting" may pertain to an audio-visual activity.

Figure 1A:
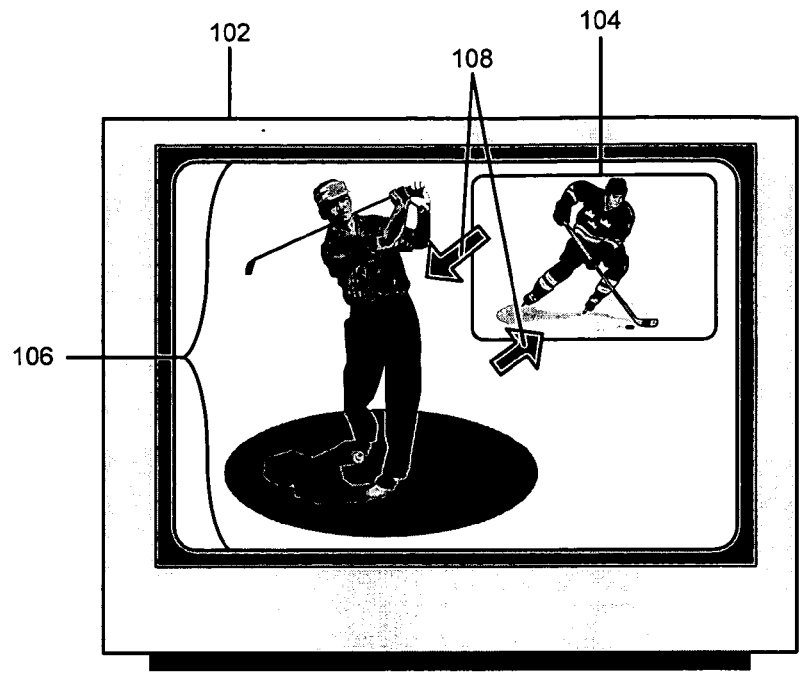
FIGS. 1A and 1B illustrate an exemplary device that shows predictive content via a picture-in-picture (PIP) window.
Figure 1B:
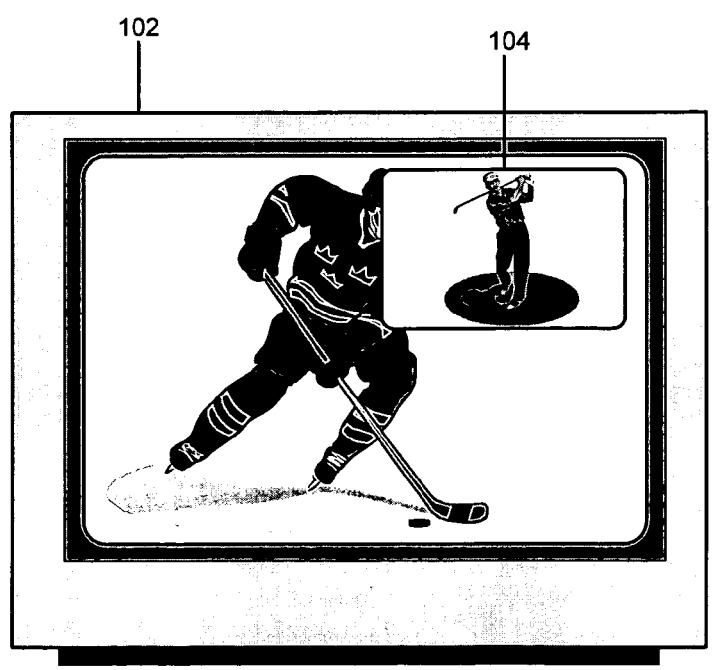

FIGS. 1A and 1B illustrate an exemplary device 102 that shows predictive multimedia content via picture-in-picture (PIP) window 104. As shown, device 102 (e.g., a television) may present a show or a program that is delivered over a network (not shown) to a viewer.

When a viewer is watching a show/program, the content provider may review the viewer's viewing profile (e.g., a list of shows/programs that the viewer has accessed/watched), determine the viewer's favorite show/program based on the viewing profile, and send a name of the favorite show/program to device 102 at appropriate moments (e.g., 5 minutes before the viewer's favorite program starts).

Device 102 may show the favorite show/program in picture-in-picture window (PIP) 104. Furthermore, by using a remote control, the viewer may swap the contents of PIP window 104 with contents of main viewing area 106, as indicated by arrows 108 in FIG. 1A. The result of swapping the contents of main viewing area 106 with that of PIP window 104 is illustrated in FIG. 1B. Alternatively, the viewer may continue to watch the original program in main viewing area 106. After few seconds, PIP window 104 may vanish or fade away, allowing the viewer to watch a show/program on device 102 unobstructed.

In the above scenario, by automatically providing the viewer with an option to watch the viewer's favorite show/program, device 102 and the content provider may spare the viewer from scanning through an interactive program guide or flipping through a myriad of channels to locate the viewer's favorite show/program.

Figure 2:
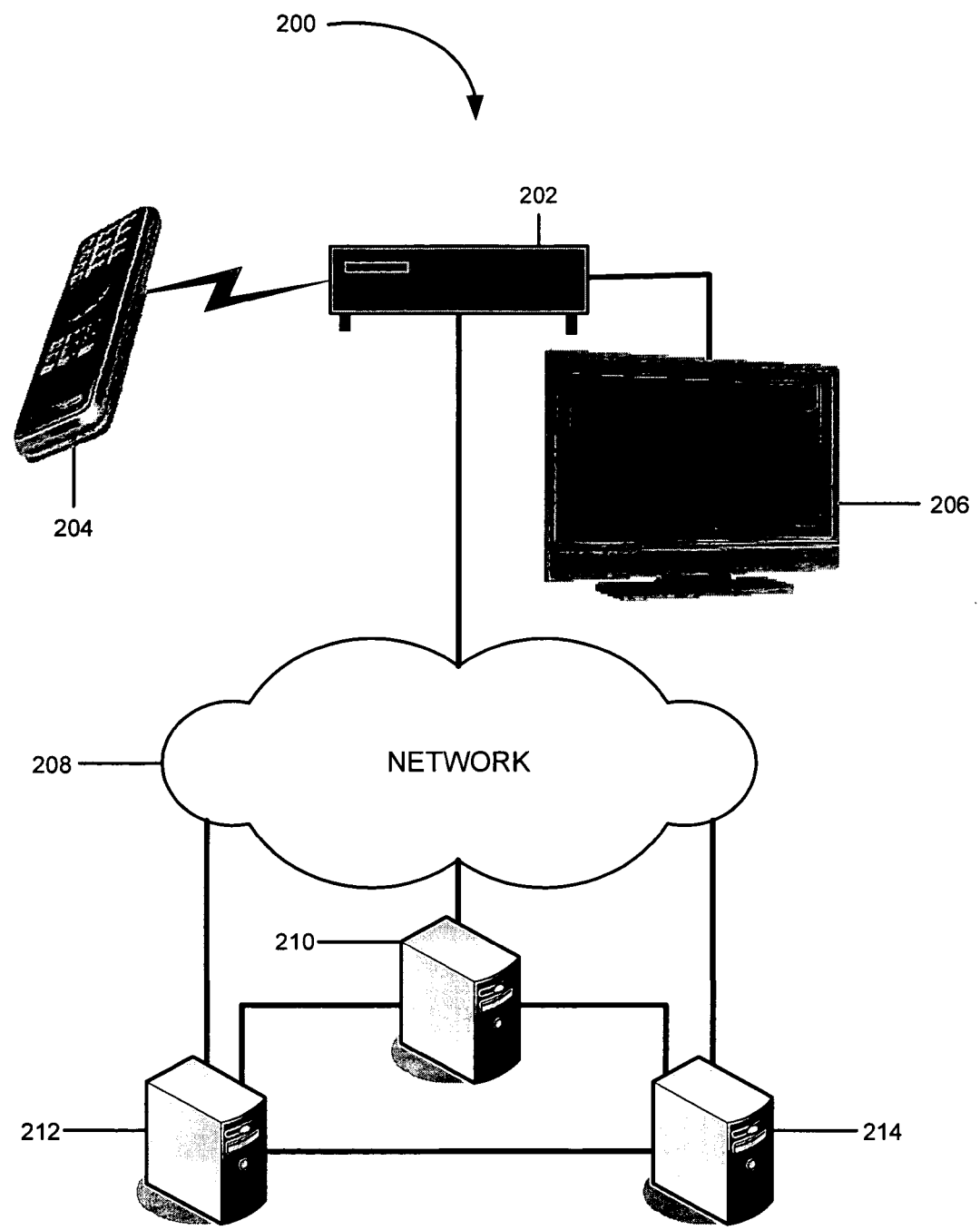
FIG. 2 is a block diagram of an exemplary network in which concepts described herein may be implemented.

FIG. 2 is a block diagram of an exemplary network 200 in which concepts described herein may be implemented. As shown, network 200 may include a controller 202, a remote control 204, a content presentation device 206, a network 208, a content server device 210, a log device 212, and a viewer profile device 214. In other implementations, network 200 may include additional, fewer, or different devices. For example, network 200 may include a content distribution system (e.g., video broadcast system), additional controllers, etc. Moreover, one or more devices of network 200 may perform one or more functions of another device of network 200. For example, controller 202 and content presentation device 206 may be implemented as a single device. In another example, content server device 210, log device 212, and/or viewer profile device 214 may be implemented as one or more devices.

Controller 202 may include a device for receiving commands from remote control 204 and for obtaining and/or playing content on content presentation device 206. The content may be obtained from a content distribution system (e.g., a video broadcast system) (not shown). Examples of controller 202 may include a set-top box or a component (e.g., a cable card) that plugs-into a host device (e.g., a digital video recorder, a personal computer, a television, etc.) and allows the host device to display multimedia content (e.g., contents on digital cable television channels). Although controller 202 can be implemented as different types of devices (e.g., a set-top-box, a computer, a digital video disk (DVD) player, a cable card, etc.), in the following, controller 202 will be described in terms of a set-top box.

Remote control 204 may include a device for issuing wireless commands to and for controlling electronic devices (e.g., a television, a set-top box, a stereo system, a digital video disc (DVD) player, etc.). In different implementations, in place of remote control 204, other types of devices (e.g., a wireless keyboard, mouse, a handheld device (e.g., cell phone), etc.) may be used to control the electronic devices.

Content presentation device 206 may include a device for playing broadcast media signals and/or signals from controller 202. Examples of content presentation device 206 may include a television, one or more speakers and a display, a portable digital assistant (PDA) or a cell phone capable of outputting a received video, etc. In the following paragraphs, content presentation device 206 will be described in terms of a television.

Network 208 may include a fiber-optics network (e.g., passive optical networks (PONS)), an ad hoc network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks. Devices (e.g., controller 202, content server device 210, log device 212, viewer profile device 214, etc.) that are shown in FIG. 2 may connect to network 208 via wireless or wired communication links.

Content server device 210 may include one or more devices for providing preview information to controller 202 and/or content presentation device 206.

Log device 212 may include storage media and a mechanism for writing, on the storage media, records of viewer activities. In some implementations, log device 212 may receive information about activities of many viewers (e.g., tens of thousands), and may be optimized to handle high-volume reads and writes.

Viewer profile device 214 may include one or more devices for obtaining viewing patterns of viewers based on information from log device 212 and for storing the obtained viewing patterns (e.g., a viewer's favorite programs). For example, viewer profile device 214 may obtain and store, based on information from log device 212, that John Doe usually watches baseball games or The American Idol on Tuesday nights at 8:00 p.m. Such information may be valuable to and/or sold to advertisers that wish to budget their expenses between competing programs/shows. For example, view profile device may aggregate viewing habits of large number of viewers that allow advertisers to know which televisions shows/programs are being watched.

Figure 3:
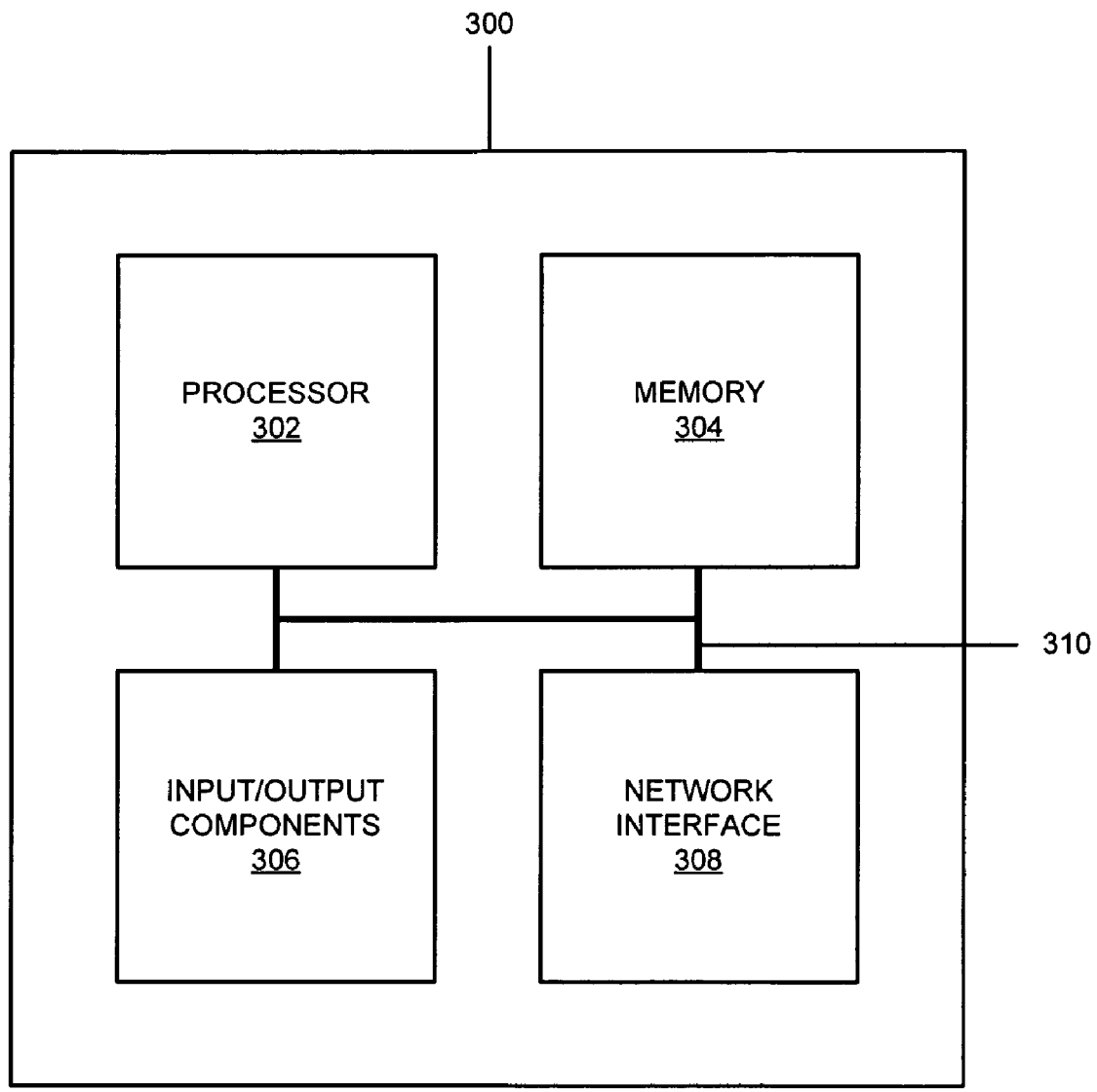
FIG. 3 is a block diagram of an exemplary device of FIG. 2.

FIG. 3 is a block diagram of an exemplary network device 300, which may correspond to controller 202, content presentation device 206, content server device 210, log device 212, or viewer profile device 214. As shown, network device 300 may include a processor 302, a memory 304, input/output components 306, a network interface 308, and a communication path 310. In different implementations, network device 300 may include additional, fewer, or different components than the ones illustrated in FIG. 3. For example, network device 300 may include additional line interfaces, such as interfaces for receiving and forwarding data.

Processor 302 may include a processor, a microprocessor, an Application Specific Integrated Circuit (ASIC), a Field Programmable Gate Array (FPGA), and/or other processing logic capable of controlling network device 300. Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Input/output components 306 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 300.

Network interface 308 may include any transceiver-like mechanism that enables network device 300 to communicate with other devices and/or systems. For example, network interface 308 may include mechanisms for communicating via a network, such as the Internet, a terrestrial wireless network (e.g., a WLAN), a satellite-based network, etc. Additionally or alternatively, network interface 308 may include a modem, an Ethernet interface to a LAN, and/or an interface/connection for connecting network device 300 to other devices (e.g., a Bluetooth interface).

Communication path 310 may provide an interface through which components of network device 300 can communicate with one another.

Figure 4:
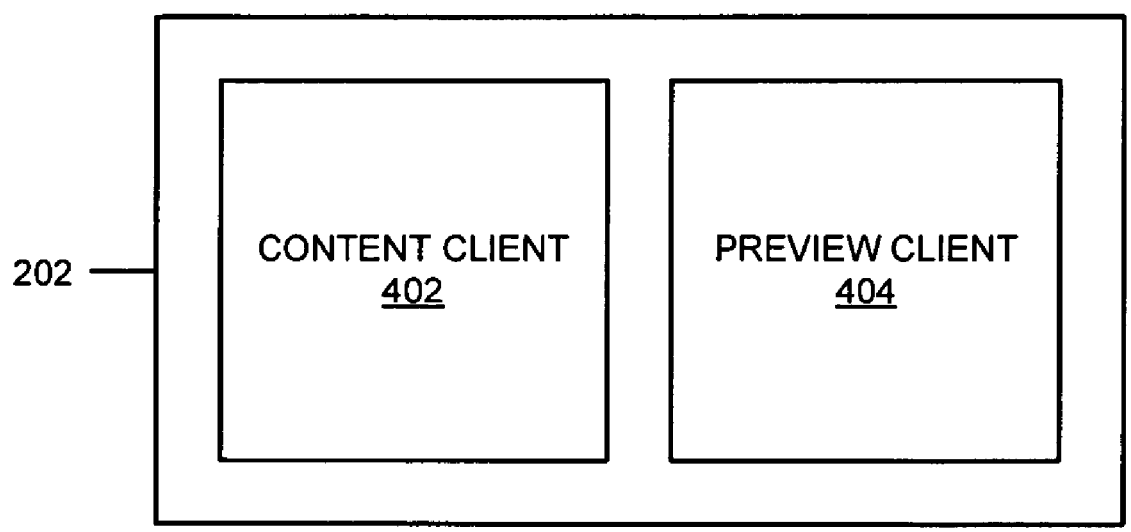
FIG. 4 is a functional block diagram of an exemplary controller of FIG. 2.

FIG. 4 is a functional block diagram of controller 202. As shown, controller 202 may include a content client 402 and a preview client 404. Depending on the implementation, controller 202 may include additional components, such as components illustrated in network device 300, an operating system (e.g., Linux, Windows, etc.), and application, etc. Furthermore, in some implementations, functionalities of content client 402 and/or preview client 404 may be organized in a single component or more than two components.

Content client 402 may include hardware and/or software for outputting multimedia content/data that is received from a content distribution system (not shown) to content presentation device 206. Content client 402 may receive audio/video data, and, based on the received audio/video data, may generate audio/video signals that are directed to content presentation device 206. Content client 402 may be implemented as a stand-alone application or as part of another component, such as a browser (not shown).

Preview client 404 may include hardware and/or software for sending messages regarding user commands to log device 212, sending preview related commands to content server device 210, and/or aiding content client 402 in presenting viewer's favorite program in a predictive content preview area of the display of content presentation device 206. For example, when controller 202 receives a command to change a channel, preview client 404 may send a message to log device 212. Log device 212 may record the viewer activity based on the message.

In another example, when controller 202 receives a command to change the channel from the viewer, preview client 404 may verify whether controller 202 is in a predictive content preview mode (e.g., a mode in which predictive content is provided to the viewer for a preview). If controller 202 is in the predictive content preview mode, preview client 404 may request that content server device 210 send a list of the viewer's favorite shows/programs. Content client 402 may present the shows/programs in the list in predictive content preview areas (e.g., PIP window 104), or alternatively, show the list of shows/programs in a text area (e.g., a scrolling text box located in a bottom or side portion of the screen). Some viewers may find the text box less distracting or obtrusive than PIP window 104.

In aiding content client 402 to present the viewer's favorite shows/programs in PIP windows 104, preview client 404 may provide parameters that are related to PIP windows 104 to content client 402 (e.g., locations/sizes/shapes of PIP windows, locations/shapes/sizes of text windows, etc.). Content client 402 may use the parameters to display the user's favorite shows/programs in PIP windows 104. Depending on the implementation, controller 202 may automatically set such parameters, or alternatively, preview client 404 may provide a user interface via which the viewer may input/edit the values.

In some implementations, preview client 404 may aid content client 402 in controlling the length of time for which a preview area (e.g., PIP window 104) may remain visible on a display of content presentation device 206. For example, preview client 404 may cause PIP window 104 to remain on the display for a period of time, such as 3 seconds, and vanish. In another example, preview client 404 may allow the viewer to cause, via remote control 204, PIP window 104 to remain visible, in case the viewer wishes to track the favorite show/program in PIP window 104. Alternatively, preview client 404 may allow the viewer to cause a show/program that is shown in PIP window 104 to be recorded, via remote control 204, so that the viewer can view the show/program at a later time. Pushing a button on remote control 204 to record the show/program may remove PIP window 104 from the display.

In one implementation, preview client 404 may track whether a viewer repeatedly cancels/removes PIP window 104 as soon as it appears on the display for a particular show/program. Based on such information, preview client 404 may stop presenting PIP window 104 for the particular show/program. In a different implementation, this feature may be implemented via content server device 210.

In another implementation, preview client 404 may allow the viewer to schedule when preview client 404 may request content server device 210 to send a list of viewer's favorite shows/programs. For example, the viewer may schedule preview client 404 to automatically request content server device 210 to send the list at 9:05 p.m. Eastern Standard Time (EST), five minutes after each hour (to enable the user to change programs relatively early in the program, or at any other times. When preview client 404 receives the list of favorite shows/programs from content server device 210, preview client 404 may cause content client 402 to show the shows/programs on PIP windows 104 on the display of content presentation device 206.

Figure 5:
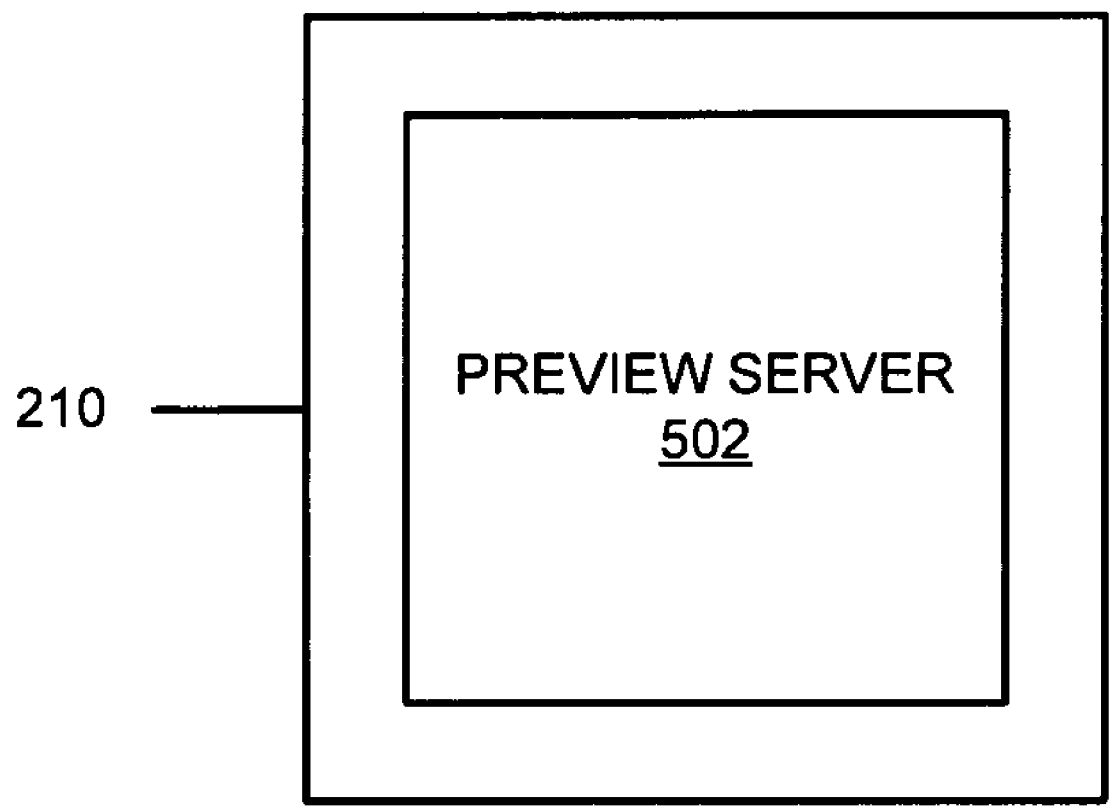
FIG. 5 is a functional block diagram of an exemplary content server device of FIG. 2.

FIG. 5 is a functional block diagram of content server device 210. As shown, content server device 210 may include a preview server 502. Depending on the implementation, content server device 210 may include additional components, such as components illustrated in network device 300, an operating system (e.g., Linux, Windows, HP-UX, etc.), and application, etc.

Preview server 502 may include hardware and/or software for performing tasks that are associated with a list of favorite shows/programs (e.g., predictive content). For example, content server device 210 may maintain a list of viewer's favorite shows/programs, obtain the list from viewer profile device 214, and/or periodically send the list to preview client 404. In another example, preview server 502 may track whether a viewer cancels/removes PIP window 104 as soon as it appears on the display for a particular show/program. Based on such information, preview server 502 may withhold sending preview information for the particular show/program.

Figure 6:
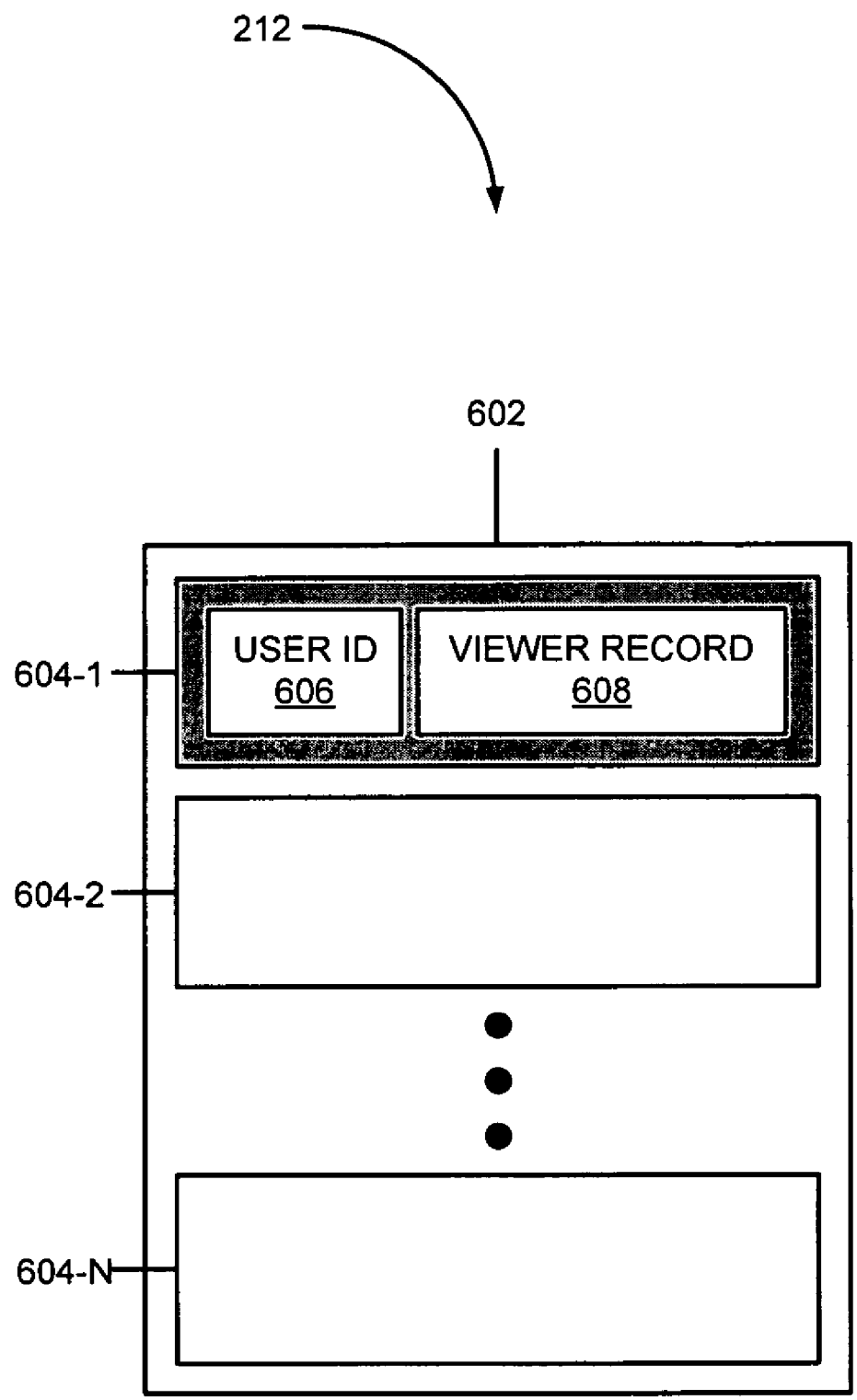
FIG. 6 is a functional block diagram of an exemplary log device of FIG. 2.

FIG. 6 is a functional block diagram of log device 212. As shown, log device 212 may include a log 602 of viewer activities. As further shown, log 602 may include log records 604-1 through 604-N (hereinafter collectively referred to as log records 604 and individually as log record 604-x), each of which may be associated with a viewer. Although not illustrated in FIG. 6, log device 212 may include additional components, such as components illustrated in network device 300, an operating system (e.g., Linux, Windows, HP-UX, etc.), and application, etc.

When log device 212 receives, from preview client 404, a message that indicates a iviewers' activity, log device 212 may record the viewer activity and store the record in log 602. In some implementations, when more than a threshold amount of log records 604 accumulate in log 602, a number of oldest log records 604 may be archived and/or moved to an off-line storage.

As illustrated by log record 604-1, each log record 604-x may include a user identifier (ID) field 606 and a viewer record field 608. User identifier field 606 may identify a viewer whose activity is logged by log record 604-x. Viewer record field 608 may identify a channel or a program that the viewer accessed, as well as the time at which the viewer accessed the channel or the program.

Figure 7:
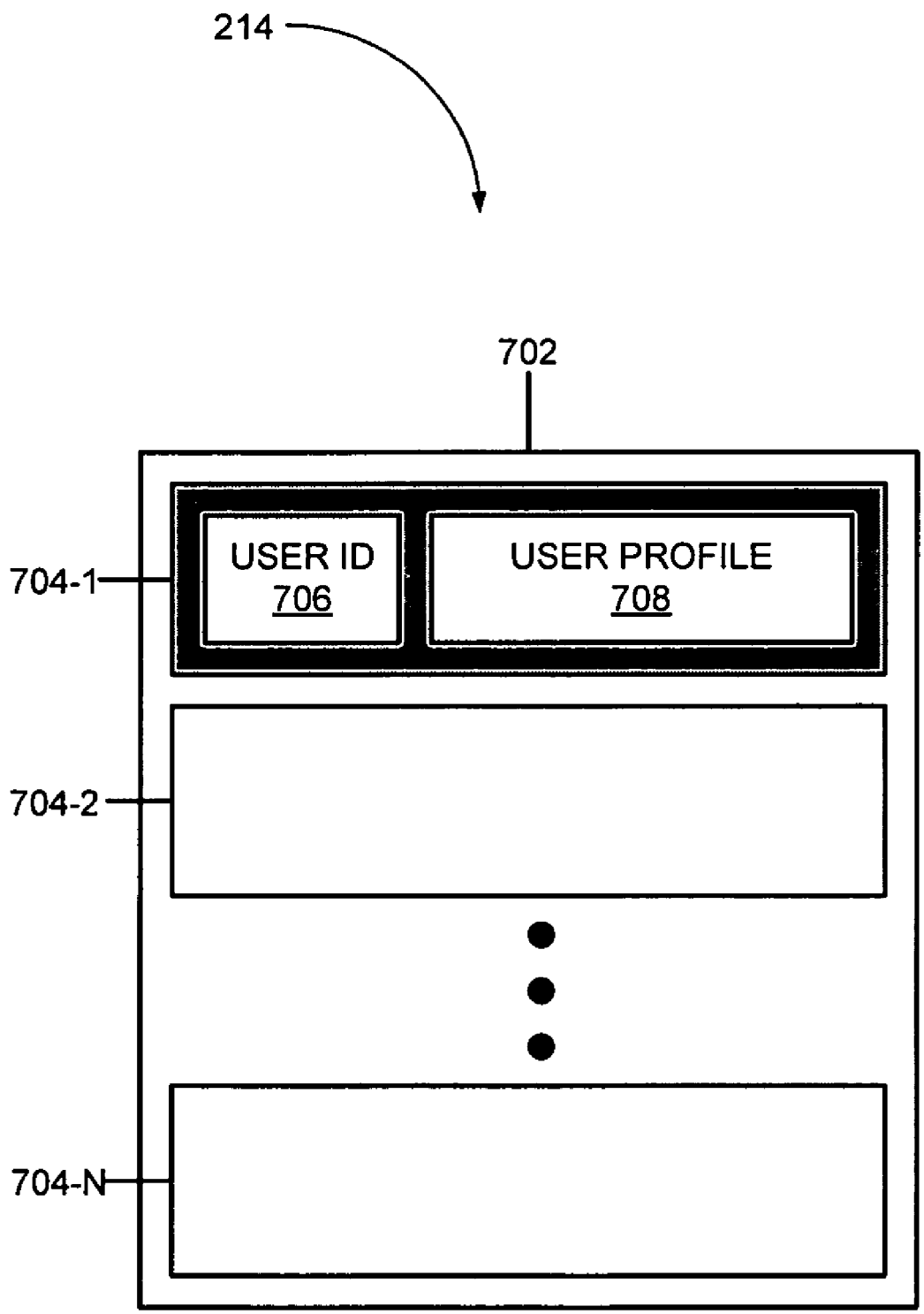
FIG. 7 is a block diagram of an exemplary viewer profile device of FIG. 2.

FIG. 7 is a block diagram of viewer profile device 214. As shown, viewer profile device 214 may include viewer profile database 702. As further shown, viewer profile database 702 may include profile records 704-1 through 704-N (hereinafter collectively referred to as profile records 704 and individually as profile record 704-x), each of which may be associated with a particular viewer or content client 402. Although not illustrated in FIG. 7, viewer profile device 214 may include additional components, such as components illustrated in network device 300, an operating system (e.g., Linux, Windows, HP-UX, etc.), and application, etc.

In FIG. 7, number of profile records 704 may increase or decrease, as additional viewers subscribe to or unsubscribe from services that are provided by content server device 210. In addition, profile records 704 may be updated, as viewer r activities are logged at log device 212, and as their viewing patterns change.

As further shown in FIG. 7, profile record 704-x may include a user identifier (ID) 706 and a user profile 708. User identifier 706 may identify a viewer whose viewing pattern is provided by profile record 704-x. User profile 708 may provide a summary of the viewer's viewing pattern.

Figure 8:
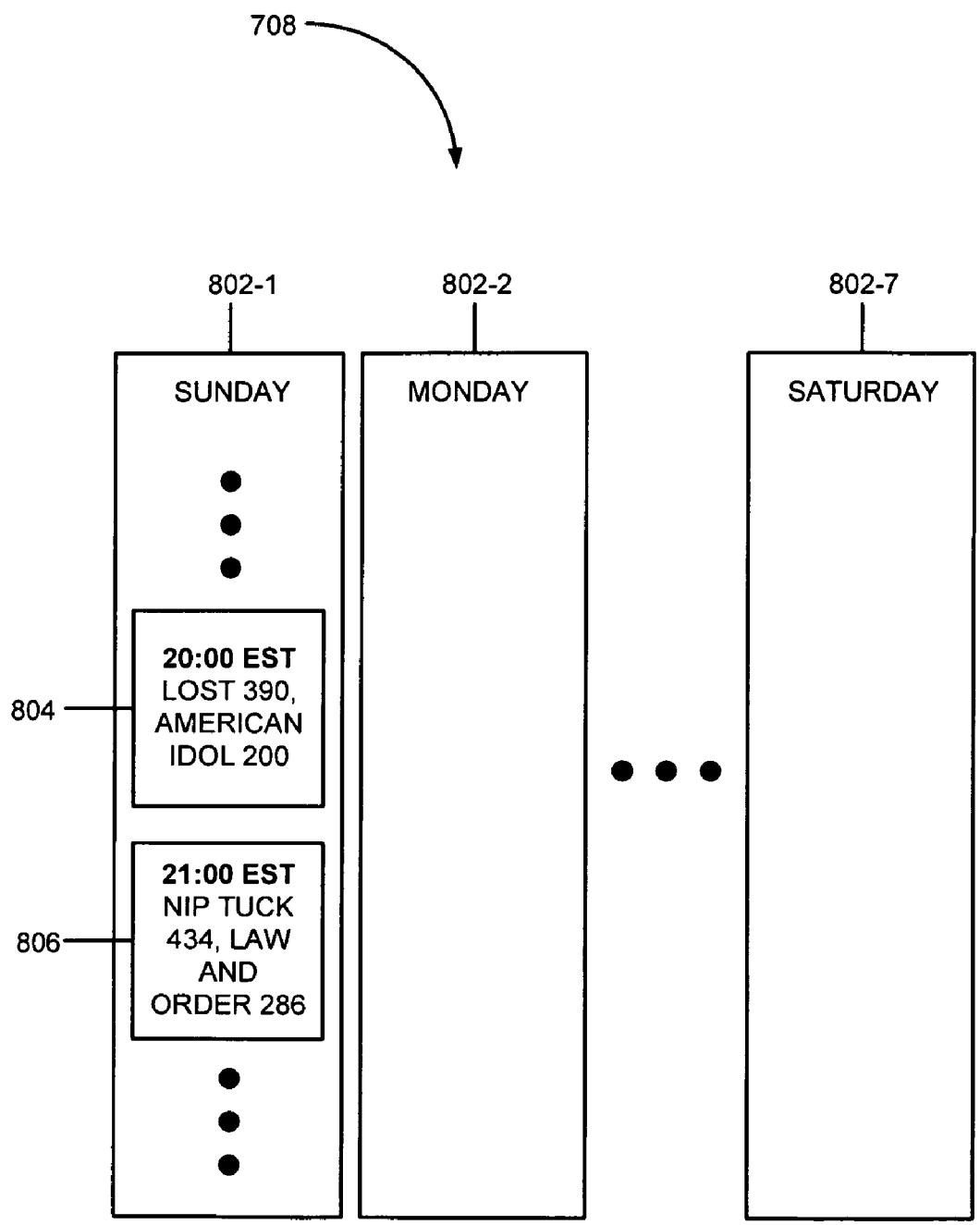
FIG. 8 is a block diagram of an exemplary user profile of FIG. 7.

FIG. 8 is a block diagram of exemplary user profile 708. As shown, user profile 708 may include days-of-week pattern records 802-1 through 802-7. Depending on the implementation, user profile 708 may be organized in one of many different ways. For instance, user profile 708 may be organized by days-of-month. In some implementations, user profile 708 may include multiple days-of-week patterns, for different seasons (e.g., the spring and the fall).

As further shown, each of days-of-week pattern records 802-1 through 802-7 may include entries, such as entries 804 and 806. Entry 804/806 may include a time stamp and a list of shows/programs. Entry 804/806 may also include, for each of the shows/programs, an aggregate amount of time that the viewer has watched the shows/programs. For example, as shown in FIG. 8, entry 804 may include a time stamp of 8:00 p.m. EST, and may indicate that the viewer has watched Lost for 390 minutes and The American Idol for 200 minutes. In a different implementation, each entry (e.g., entry 804) may include, in place of the names of actual shows/programs, a different type of identifier (e.g., a number or alphanumeric code that uniquely identifies a particular a show/program).

In some implementations, each entry may not include the number of minutes that the viewer watched a particular show/program, but a total number of times the viewer accessed the particular show/program.

Depending on the implementation, viewer profile device 214 may generate user profile 708 based on a request from content server device 210 or based on a schedule. In either case, viewer profile device 214 may examine log 602 and identify log records 604 that are associated with a particular viewer. For example, when viewer profile device 214 receives a request to provide user profile 708 for user "Jane Smith," viewer profile device 214 may retrieve log records 604 that are associated with "Jane Smith."

For each record 604-x, by extracting a channel number and the time the channel number was written into log record 604-x, and by looking up the channel number and the time in a program guide, viewer profile device 214 may identify a corresponding show/program that the viewer watched at the time. In addition, viewer profile device 214 may determine the number of minutes that the viewer watched show/program or the number of times the viewer accessed the show/program based on log records 604 and the program guide.

Figure 9:
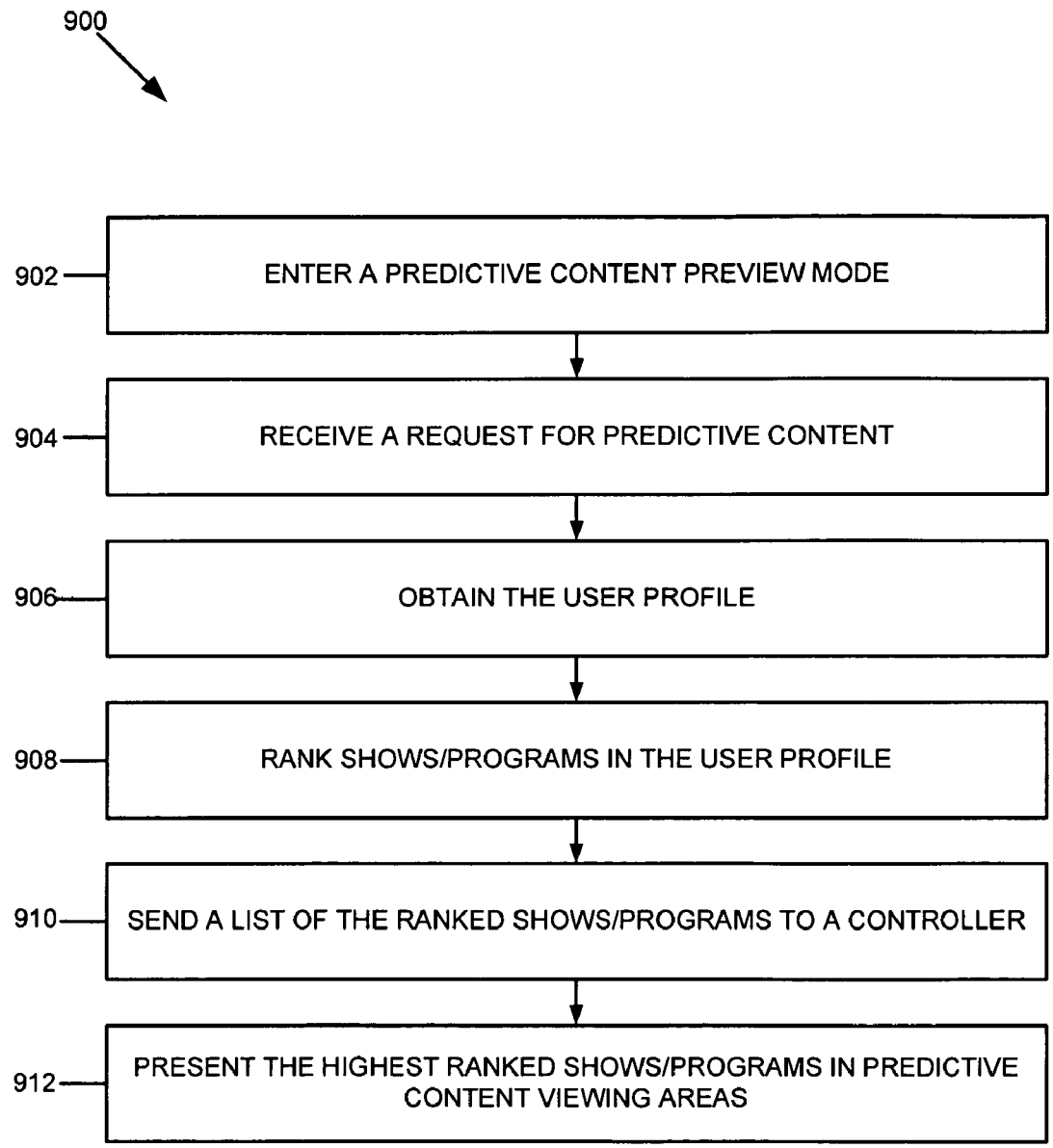
FIG. 9 is a flowchart of an exemplary process for presenting predictive content.

The above paragraphs describe system elements that are related to devices and/or components for presenting predictive content. FIG. 9 is a flow diagram of a process 900 that may be performed by one or more of these devices and/or components.

As shown in FIG. 9, process 900 may begin at block 902, where a predictive content preview mode may be entered (block 902). As used herein, the term "predictive content preview mode" may refer to a state in which controller 202 may access content based on the viewer's past viewing pattern, and present the content to the viewer for a preview. Controller 202 may enter the predictive content preview mode in response to viewer input (e.g., input via remote control 204). Alternatively, controller 202 may be set to the predictive content preview mode as a default and a viewer may turn off the predictive content preview mode via remote control 204.

A request for predictive content may be received (block 904). For example, content server device 210 may receive a request for predictive content from controller 202. Controller 202 may send the request when the viewer selects a particular channel while controller 202 is in the predictive content preview mode or at particular times pre-selected/scheduled by the viewer. Controller 202 may send the request over network 208 to content server device 210 and a message indicating that the viewer has selected a particular program/show to log device 212.

When content server device 210 receives the request for predictive content from controller 202, content server device 210 may issue a request, to viewer profile device 214, to obtain user profile 708 that is associated with the viewer.

In a different implementation, content server device 210 may obtain user profile 708 without receiving a request from controller 202. This feature may be driven by show/program schedule (e.g., when a show/program is about to end, content server device 210 make a request for user profile 708), which may be stored at either controller 202 or at content server device 210, as part of push mechanism.

User profile 708 may be obtained (block 906). For example, viewer profile device 214 may obtain user profile 708 in response to the request for user profile 708 associated with the viewer from content server device 210. When viewer profile device 214 receives the request, viewer profile device 214 may search for user profile 708 in profile database 702 and retrieve user profile 708 that is recent or that meets a set of criteria (e.g., a user profile for the fall of 2007).

If viewer profile device 214 is unable to find an appropriate user profile 708, viewer profile device 214 may issue a request to log device 212 to obtain log records 604 that are associated with the viewer. The request may include a user identifier and other information that log device 212 may use to retrieve log records 604. For example, the request may specify a user identifier of 7032394548121 and a time window that spans April-June of 2007. In response, log device 212 may return log records 604 whose user identifier fields 606 includes the value 7032394548121 and whose viewer record field 608 includes a time stamp dated within the time window April-June of 2007. In some implementations, viewer profile device 214 may specify time windows based on seasons or years that may have a bearing on viewer's current viewing habits.

When viewer profile device 214 receives log records 604 from log device 212, viewer profile device 214 may determine amounts of time that the viewer may have spent viewing different shows/programs. To perform the preceding, for each log record 604-*x*, viewer profile device 214 may calculate an amount of time that elapsed between the time specified by a time stamp within log record 604-*x* and another time specified by a time stamp within a subsequent log record. Furthermore, viewer profile device 214 may identify a show/program which the viewer watched, based on a channel number and a time stamp in viewer record field 608 of log record 604-*x*.

For example, assume that log device 212 provides log records 604-1 and 604-2, both of which pertain to viewer A, to viewer profile device 214. In addition, assume that log record 604-1 includes a time stamp of May 2, 2008 18:00 and a channel number 54, and log record 604-2 includes a time stamp of May 2, 2008 19:00 and a channel number 57. Based on the time stamps, viewer profile device 214 may determine that viewer A watched channel 54 for 60 minutes. In addition, viewer profile device 214 may identify the show/program that was on channel 54 at 18:00-19:00 on May 2, 2008 by looking up the channel and the time in a program guide.

In different implementations, as explained above with reference to user profile 708, user profile 708 may indicate a number of times the viewer accessed each of the shows/programs. In such a case, viewer profile device 214 may retrieve or tally the number of times that the viewer accessed each of the shows/programs based on log records 604. Viewer profile device 214 may also implement mechanisms to avoid registering channel surfing activities as valid viewer accesses. For example, if a program was not watched/accessed for at least a pre-determined duration (e.g., 5 minutes), that program will not be registered in viewer profile device 114.

Once viewer profile device 214 determines, an amount of time or a number of times that the viewer accessed each of the shows/programs, viewer profile device 214 may create a list of the shows/programs. In some implementations, viewer profile device 214 may organize the list of shows/programs based on day-of-the-week, to obtain user profile 708, or based on another scheme (e.g., rank the shows/programs based on the number of times the viewer accessed each show without regard to day-of-the-week).

Shows/programs in user profile 708 may be ranked (block 908). For example, viewer profile device 214 may rank the shows/programs in user profile 708 based on the amount of time the viewer spent watching each show/program. In a different implementation, viewer profile device 214 may rank the shows/program based on the number of times that each show/program has been accessed. Viewer profile device 210 may send a list of ranked shows/programs to content server device 210.

A list of ranked shows/programs may be sent to controller 202 (block 910). For example, content server device 210 may send a list of ranked shows/programs to controller 202.

The highest ranked shows/programs may be presented in predictive content viewing areas (block 912). For example, content client 402 may present the show/program that is requested by the viewer in main viewing area 106 and the highest ranked show in PIP window 104. If the highest ranked show/program is as same as the requested program/show, content client 402 may present the second highest ranked show in PIP window 104.

In some implementations, the viewer may be able to select favorite shows via a user interface on controller 202, and these favorite shows may be shown in predictive content viewing areas, regardless of the viewer's past viewing habits. For example, if the viewer indicates that the viewer likes to watch American Idol, American Idol may be shown in PIP window 104 when American Idol is broadcast.

Figure 10:
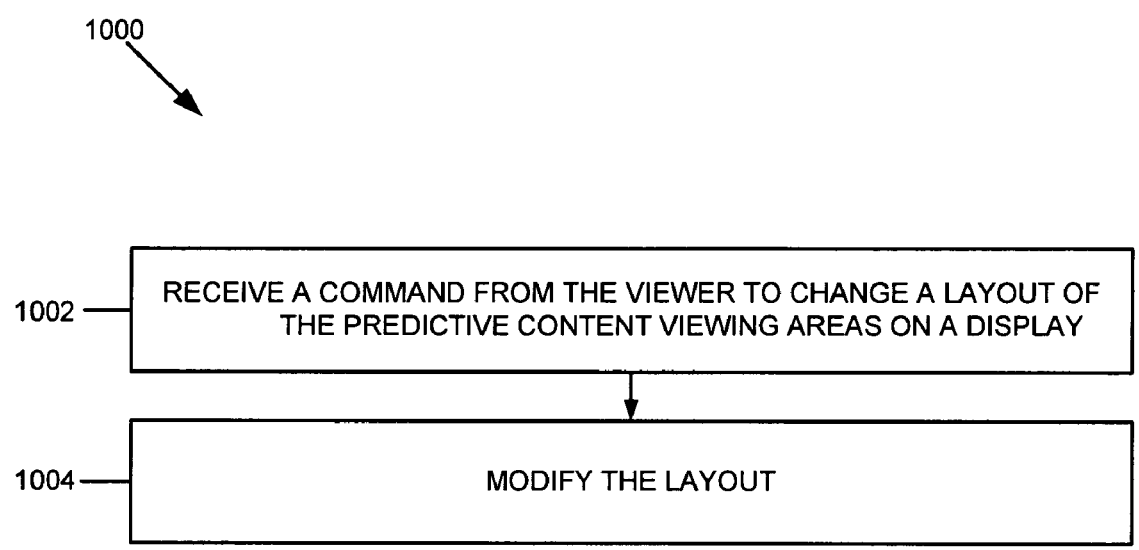
FIG. 10 is a flow chart of an exemplary process for changing a viewing layout that is associated with predictive content.

FIG. 10 is a flow diagram of an exemplary process 1000 for modifying a viewing layout that is associated with predictive content. At block 1002, a command from the viewer to change a layout of predictive content viewing areas may be received (e.g., PIP window 104) (block 1002). For example, controller 202 may receive a command from the viewer via remote control 204. The command may instruct, for example, controller 202 to swap contents of PIP window 104 with that of main viewing area 106. In another example, the command may instruct controller 202 to close PIP window 104. In yet another example, the command may instruct controller 202 to record a show/program that is being previewed in PIP window 104. Controller 202 may close PIP window 104 in response to the record command.

The layout may be modified (block 1004). For example, if the command indicates that the predictive content is no longer to be displayed, controller 202 may remove PIP window 104 from the display of content presentation device 206. In another example, controller 202 may swap the contents of the predictive content viewing area and that of the main viewing area.

Figure 11A:
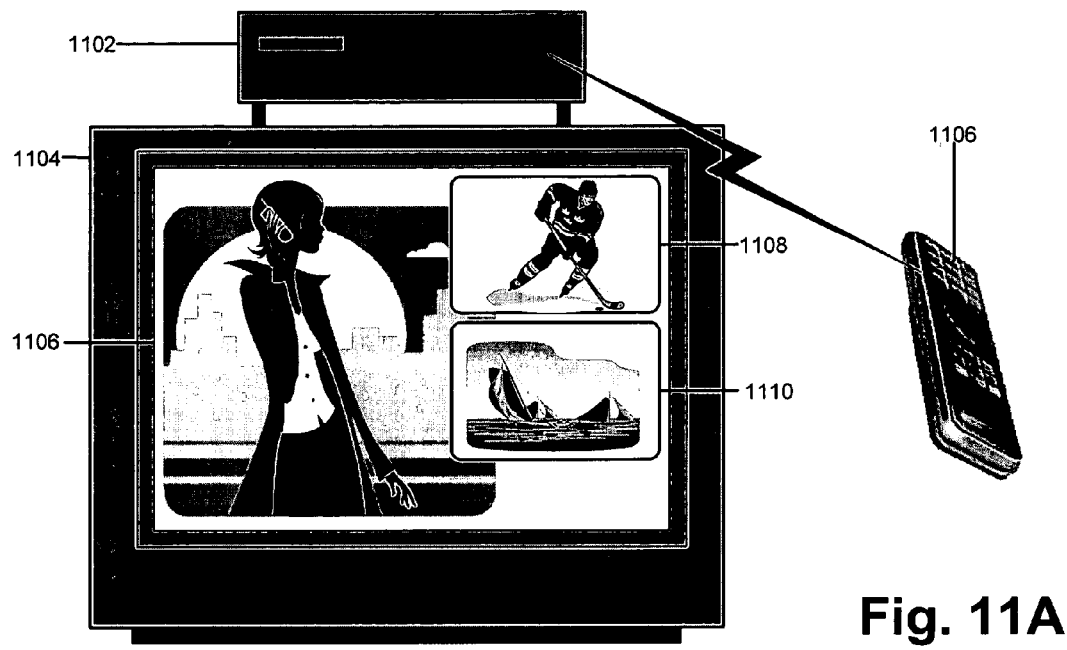
FIGS. 11A and 11B illustrate a scenario that involves predictive content.
Figure 11B:
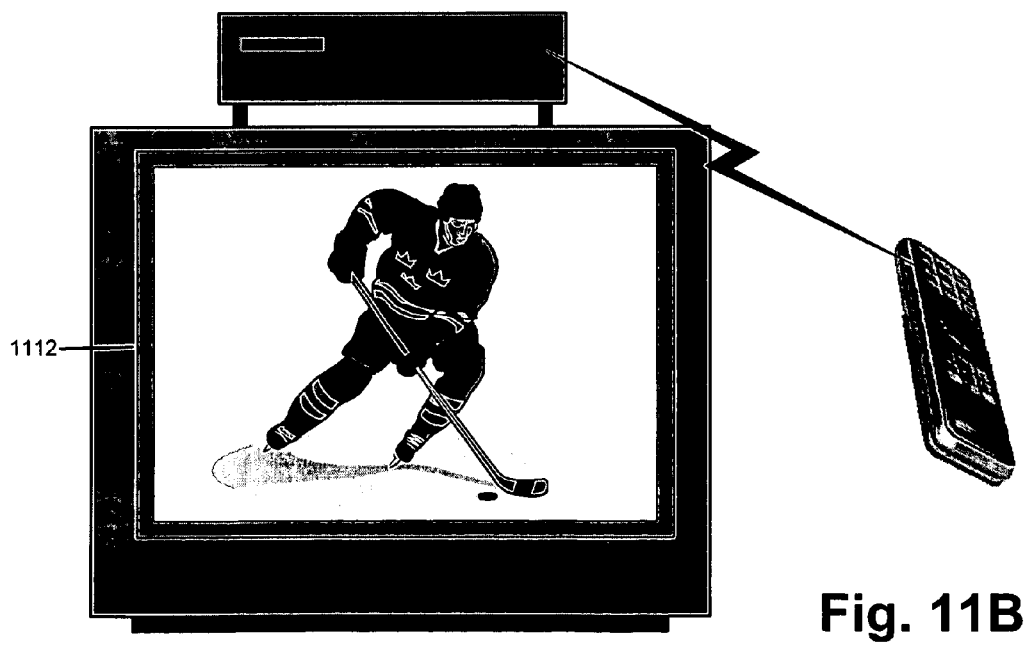

The following example, with reference to FIGS. 11A and 11B, illustrates the processes for presenting predictive content. The example is consistent with exemplary processes 900 and 1000 described above with reference to FIG. 9 and FIG. 10.

In FIG. 11A, assume that a set-top box 1102 (e.g., controller 202) is attached to a television 1104, set-top-box 1102 is in a predictive content preview mode, and John, a user, uses a remote control 1106 to control set-top box 1102. In addition, assume that John's two favorite shows/programs are Rangers hockey games and the Bay Watch television program, both scheduled to be on at 9:00 p.m. on a Thursday night.

On a Thursday night, at 8:30 p.m., John begins to watch Pajama Party on channel 19. As John becomes absorbed in the movie, John forgets that the Rangers game and Bay Watch are being broadcast at 9:00 p.m.

At 9:00 p.m., when a Rangers game and Bay Watch are both broadcast, set-top box 1102 sends a scheduled request for predictive content to content server device 210. Content server device 210 retrieves user profile 708 from viewer profile device 214 and determines that John likes to watch a Rangers game and/or Bay Watch.

Content server device 210 sends a message to set-top box 1102 over network 208, indicating that Rangers game and Bay Watch are John's favorite shows. Set-top box 1102 opens PIP window 1108 for Rangers game and PIP window 1110 for Bay Watch within main viewing area 1106, which is showing the show currently selected by John (i.e., Pajama Party in this example).

When John sees the Rangers game in PIP 1108, John presses a swap button on remote control 1106. Set-top box 1102 then switches to the Rangers game in main viewing area 1112 of television 1104, as shown in FIG. 11B, and closes PIP windows 1108 and 1110.

In the above example, the viewer may receive suggestions about shows/programs from content server device 210 via PIP windows 1108 and 1110 based on past viewing habits. By providing the viewer with an option to watch the viewer's favorite show/program, device 1104 and the content provider may spare the viewer from scanning through an interactive program guide or flipping through channels to locate the viewer's favorite show/program.

The foregoing description of implementations provides illustration, but is not intended to be exhaustive or to limit the implementations to the precise form disclosed. Modifications and variations are possible in light of the above teachings or may be acquired from practice of the teachings.

Figure 12:
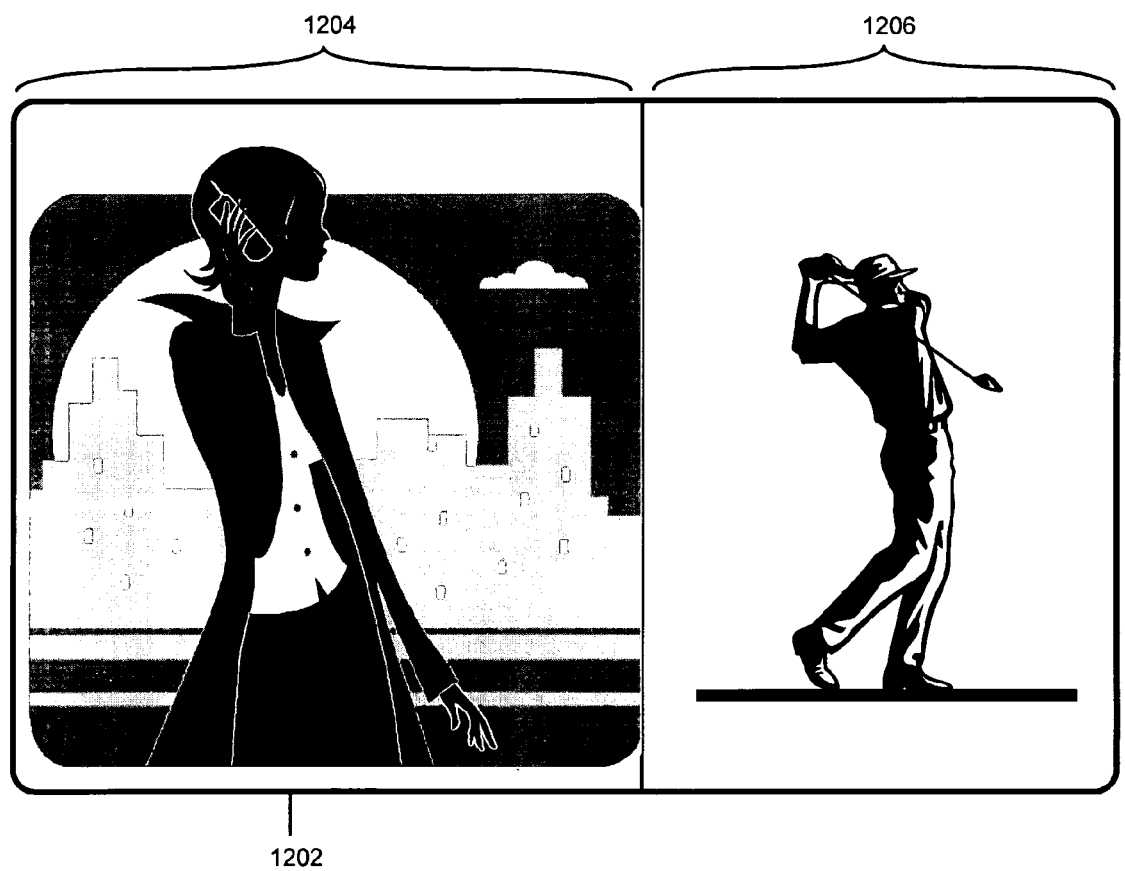
FIG. 12 illustrates an exemplary split-screen window for presenting predictive content.

For example, while FIGS. 1A, 1B, and 11A show a predictive content viewing area as PIP windows 104, 1108, and 1110, different arrangements may be used to display predictive content. For instance, FIG. 12 shows a split-screen predictive content viewing area. As shown, display 1202 may be split into a main viewing area 1204 and a preview area 1206. The viewer may select or activate an audio from either main viewing area 1204 or preview area 1206, by pushing a left key or right key (not shown) on remote control 204.

In another example, while predictive content has been described as being sent to controller 202 when the viewer changes a channel or in accordance with a schedule, in a different implementation, content server device 210 may send an alert that lists the viewer's favorite shows before the favorite shows are actually broadcast.

In addition, while series of blocks have been described with regard to an exemplary processes illustrated in FIGS. 9 and 10, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, from a control device, over a network, a request for a list of media programs associated with a user;
   retrieving, responsive to the request, log records identifying a channel number and a corresponding time of day for a plurality of media programs that have been presented via one or more devices associated with the user;
   identifying, using a program guide, one or more media programs of the plurality of media programs;
   determining a number of instances in which the one or more media programs have been presented via the one or more devices for a period of time exceeding a particular threshold amount of time;
   generating, based on the number of instances, a ranked list of the one or more media programs;
   identifying, from the ranked list, at least a highest ranked media program based on the ranked list, of the one or more media programs, corresponding to a current time slot or an upcoming time slot; and
   sending, over the network, to the control device, information associated with the at least highest ranked media program,
      wherein the control device is configured to output the at least highest ranked media program to a preview window, including a picture-in-picture in a main viewing area of a display, of the one or more devices, when content other than the at least one media program is being presented via the main viewing area during the current time slot.

2. The method of claim 1, wherein the control device is further configured to:
remove the picture-in-picture window after a particular amount of time from the main viewing area of the display; or
remove the picture-in-picture window and record contents of the picture-in-picture window in response to input received via a remote control.

3. The method of claim 1, further comprising:
scheduling sending of the information associated with the at least highest ranked media program at a particular time.

4. The method of claim 1, wherein the control device is further configured to:
output the information associated with the at least one media program to the picture-in-picture window or a split-screen window on the display; or
output a portion of the information associated with the at least highest ranked media program to a text box on the display.

5. The method of claim 1, wherein the control device is further configured to:
exchange content in the main viewing area of the display with content in the preview window; or
select, based on input from the viewer, either an audio that is associated with content in the main viewing area or an audio that is associated with content in the preview window.

6. The method of claim 5, wherein the control device is further configured to:
send a message to a log device indicating that a particular media program is being presented via a channel of the one or more devices at a particular time.

7. The method of claim 1, wherein the control device is further configured to:
enter a mode in which the request is automatically generated by the control device when a command to change a channel of the one or more devices is received.

8. A system comprising:
a database that includes logged information identifying a plurality of programs that have been presented, via one or more devices associated with a user, in a number of different instances; and
a server to:
receive a request, over a network, from a controller, for a list of one or more programs, of the plurality of programs, corresponding to a scheduled time slot,
aggregate, based on the logged information, an amount of time associated with the number of different instances, for each of the one or more programs,
generate, based on the aggregated amounts of time, a ranking of the list of one or more programs,
identify at least a highest-ranked program based on the rankings,
generate information associated with the identified program, and
send the information associated with the identified program to the controller over the network, wherein the controller is configured to:
send the request to the server;
receive the information associated with the identified program; and
present, when content other than the identified program is being presented via the one or more devices, the identified program in a preview window including a picture-in-picture window.

9. The system of claim 8, wherein the controller is further configured to:
enter a predictive content preview mode in which the controller automatically sends the request for the list of one or more programs to the server.

10. The system of claim 8, wherein the controller is further configured to:
accept, from the user, input to schedule receipt of the information associated with the identified program.

11. The system of claim 8, wherein the controller includes at least one of:
a set-top box;
a cable card;
a computer; or
a digital video disk (DVD) player.

12. The system of claim 8, wherein the system further includes:
a log device to record information identifying channels over which the one or more devices receive the plurality of programs.

13. The system of claim 12, wherein the log device is configured to:
receive a message from the controller indicating navigation among the channels.

14. The system of claim 8, wherein the network includes:
a passive optical network (PON).

15. A method comprising:
generating a list of media programs that have previously been presented via at least one device associated with a user;
ranking the media programs, relative to each other, based on one of:
a total number of different instances in which respective media programs have been presented, via the at least one device, for a period of time exceeding a particular amount of time, or
an aggregated amount of time associated with a duration of the total number of different instances, for the respective media programs;
identifying, from the ranked list, at least a highest-ranked media program and a second highest-ranked media program;
determining that the highest-ranked media program is currently being presented via a first device associated with the user; and
providing, when the first device is currently presenting the highest-ranked media program, only information related to the second highest-ranked media program from the ranked list, for presentation concurrently with the highest-ranked media program via the first device.

* * * * *